United States Patent
Baloga et al.

(10) Patent No.: US 7,322,649 B2
(45) Date of Patent: Jan. 29, 2008

(54) CHILD SAFETY SEAT

(75) Inventors: Thomas Charles Baloga, Fort Mill, SC (US); Adrian Simms, Winsboro, SC (US)

(73) Assignee: Britax Child Safety Inc., Charlotte, NC (US)

( * ) Notice: Subject to any disclaimer, the term of this patent is extended or adjusted under 35 U.S.C. 154(b) by 330 days.

(21) Appl. No.: 10/858,682

(22) Filed: Jun. 2, 2004
(Under 37 CFR 1.47)

(65) Prior Publication Data
US 2006/0138824 A1    Jun. 29, 2006

Related U.S. Application Data

(60) Provisional application No. 60/475,618, filed on Jun. 4, 2003.

(51) Int. Cl.
*A47D 1/10* (2006.01)
(52) U.S. Cl. .................................................. 297/253
(58) Field of Classification Search ............... 297/253, 297/250.1, 463.1, 452.4, 252, 440.24
See application file for complete search history.

(56) References Cited

U.S. PATENT DOCUMENTS

| 5,524,965 | A * | 6/1996 | Barley | 297/256.16 |
| 6,352,307 | B1 * | 3/2002 | Engman | 297/284.11 |
| 6,913,318 | B2 * | 7/2005 | Higley et al. | 297/383 |
| 2003/0151281 | A1 * | 8/2003 | Williams | 297/250.1 |
| 2006/0103199 | A1 * | 5/2006 | Schleif et al. | 297/250.1 |

FOREIGN PATENT DOCUMENTS

EP    0619202 A1    10/1994

* cited by examiner

*Primary Examiner*—Milton Nelson, Jr.
(74) *Attorney, Agent, or Firm*—Adams Evans P.A.

(57) ABSTRACT

A child safety seat, including a seat body having a seat bottom and a seat back. A vehicle seat attachment assembly is carried by the safety seat for securing the safety seat to rigid anchorage units carried by a vehicle proximate to a vehicle seat. The attachment assembly has a transversely-extending coupling assembly carried by the safety seat. First and second connectors are mounted on the coupling assembly for transverse adjustable alignment relative to respective first and second transversely spaced-apart rigid anchorage units. The safety seat may be attached to first and second rigid anchorage units that have differing degrees of spacing between them.

4 Claims, 4 Drawing Sheets

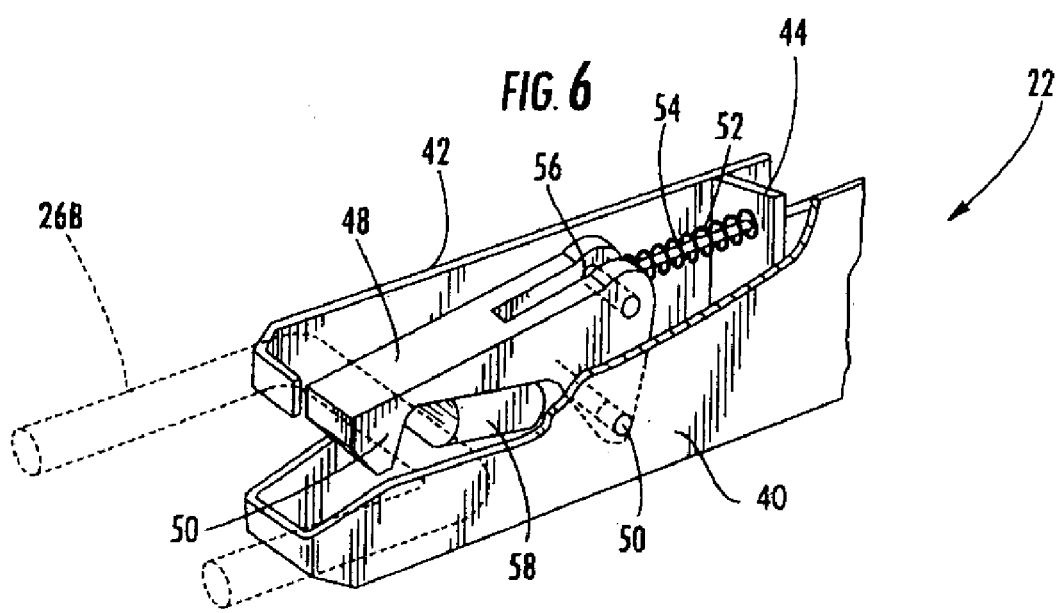

CHILD SAFETY SEAT

This application is based on and claims priority from U.S. Provisional Patent Application Ser. No. 60/475,618, filed on Jun. 4, 2003.

TECHNICAL FIELD AND BACKGROUND OF THE INVENTION

This invention relates to a child safety seat. The seat is intended to be secured to the seat of a vehicle in which the child is an occupant. The seat is secured to the vehicle seat by connecting the seat to rigid anchorage units positioned at standard locations in the bight between the seat bottom and seat back of the vehicle seat. Such anchorage units are commonly known as latch anchorages or Isofix anchorages. A seat for engagement with such anchorage units is described in EP-A-0619202. The term "latch anchorages" or "rigid anchorages" is used in this application as referring to any suitable type of anchorage units.

In many vehicles, two sets of latch anchorages are provided for only the two respective outboard rear seat positions. However, parents often prefer that infants occupy a center position on the rear seat, where they can be more easily seen and reached by the front seat passenger. At present, child safety seats are not easily and securely positionable in this center position because the inner latch anchorages of the two sets of latch anchorages are further apart than the latch anchorages in each set. Thus, the standard location and spacing does not permit the connectors on the safety seat to align and connect to the inner latch anchorages.

SUMMARY OF THE INVENTION

Therefore, it is an object of the invention to provide a child safety seat that permits adjustment of connectors on the child safety seat with latch anchorages that are spaced apart by a non-standard distance.

It is another object of the invention to provide a child safety seat that permits connectors on child safety seats to be moved and locked into non-standard positions for connection to latch anchorages having non-standard spacing.

These and other objects of the present invention are achieved in the preferred embodiments disclosed below by providing a child safety seat, comprising a seat body having a seat bottom and a seat back. A vehicle seat attachment assembly is carried by the safety seat for securing the safety seat to rigid anchorage units carried by a vehicle proximate to a vehicle seat. The attachment assembly comprises a transversely-extending coupling assembly carried by the safety seat. First and second connectors are mounted on the coupling assembly for transverse adjustable alignment relative to respective first and second transversely spaced-apart rigid anchorage units, whereby the safety seat may be attached to first and second rigid anchorage units having differing degrees of spacing between them.

According to one preferred embodiment of the invention, the coupling assembly comprises a rigid bar attached to the seat body of the safety seat.

According to another preferred embodiment of the invention, the coupling assembly comprises first and second telescoping bar components on which are mounted respective ones of the first and second connectors, whereby the connectors are transversely adjusted by varying the degree to which the first and second bar components are telescoped relative to each other.

According to yet another preferred embodiment of the invention, the assembly includes a releasable clamp for clamping the first and second bar components into a fixed, predetermined position and into a release position for adjusting the spacing of the first and second connectors relative to each other.

According to yet another preferred embodiment of the invention, the clamp includes a knob for moving the clamp between clamping and release positions.

According to yet another preferred embodiment of the invention, the connectors each comprise first and second jaws movable relative to each other between an open position for receiving a rigid anchorage unit between the jaws and a closed position with the rigid anchorage unit secured therebetween.

According to yet another preferred embodiment of the invention, the first and second jaws are biased into the closed position.

According to yet another preferred embodiment of the invention, the connectors are fixedly secured to respective ones of the first and second bar components.

According to yet another preferred embodiment of the invention, a vehicle seat attachment assembly is provided for securing a child safety seat to rigid anchorage units carried by a vehicle proximate to a vehicle seat. The attachment assembly comprises a transversely-extending coupling assembly for being attached to and carried by the safety seat. First and second connectors are mounted on the coupling assembly for transverse adjustable alignment relative to respective first and second transversely spaced-apart rigid anchorage units, whereby the safety seat may be attached to first and second rigid anchorage units having differing degrees of spacing between them.

A method of releasably securing a child safety seat to at least two variably spaced-apart rigid anchorage units carried by a vehicle comprises the steps of providing a transversely-extending coupling assembly for being attached to and carried by the safety seat, and first and second connectors mounted on the coupling assembly and positioned for transverse adjustable alignment relative to respective first and second transversely spaced-apart rigid anchorage units. The method further includes the steps of placing the safety seat on a vehicle seat, adjusting the spacing and transverse position of the first and second connectors relative to and into alignment with at least first and second ones of the rigid anchorage units, and attaching the first and second connectors to respective ones of the first and second rigid anchorages.

According to another preferred embodiment of the invention, the method includes the step of locking the first and second connectors in the aligned position.

According to yet another preferred embodiment of the invention, the step of providing a transversely-extending coupling assembly comprises the step of providing first and second telescoping bar components, and the step of locking the first and second connectors comprises the step of attaching one of the first and second connectors to respective first and second telescoping bar components.

According to yet another preferred embodiment of the invention, the step of locking the first and second connectors in the aligned position comprises the step of providing a clamp for engaging and clamping the first and second telescoping bar components into a releasable, fixed position relative to each other.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 6 is an enlarged, fragmentary top view of the locking clamp coupled to a vehicle anchorage unit.

DESCRIPTION OF THE PREFERRED EMBODIMENT AND BEST MODE

Figure 1:
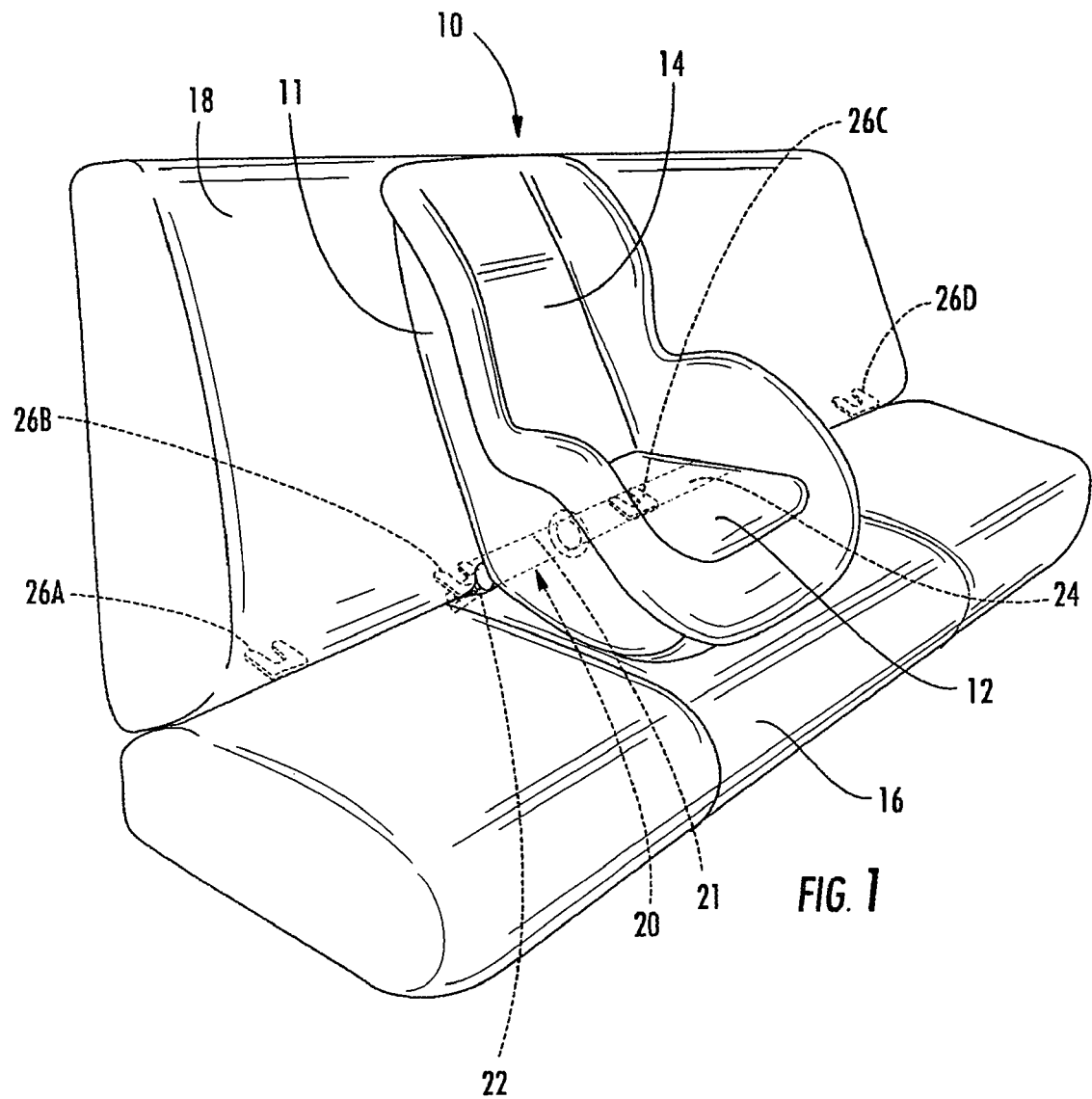
FIG. 1 is a fragmentary environmental view showing a child safety seat secured to inboard anchorages of a vehicle seat.

Referring now specifically to the drawings, a child safety seat according to the present invention is illustrated in FIG. 1 and shown generally at reference numeral 10. The safety seat 10 includes a body in the form of a shell 11 having a seat bottom 12 and a seat back 14. The seat 10 is fitted with a conventional harness (not shown) for a child occupant.

In use, the seat 10 is positioned with the seat bottom 12 supported on a vehicle seat bottom cushion 16 and the seat back 14 resting against the vehicle seat back cushion 18.

Figure 2:
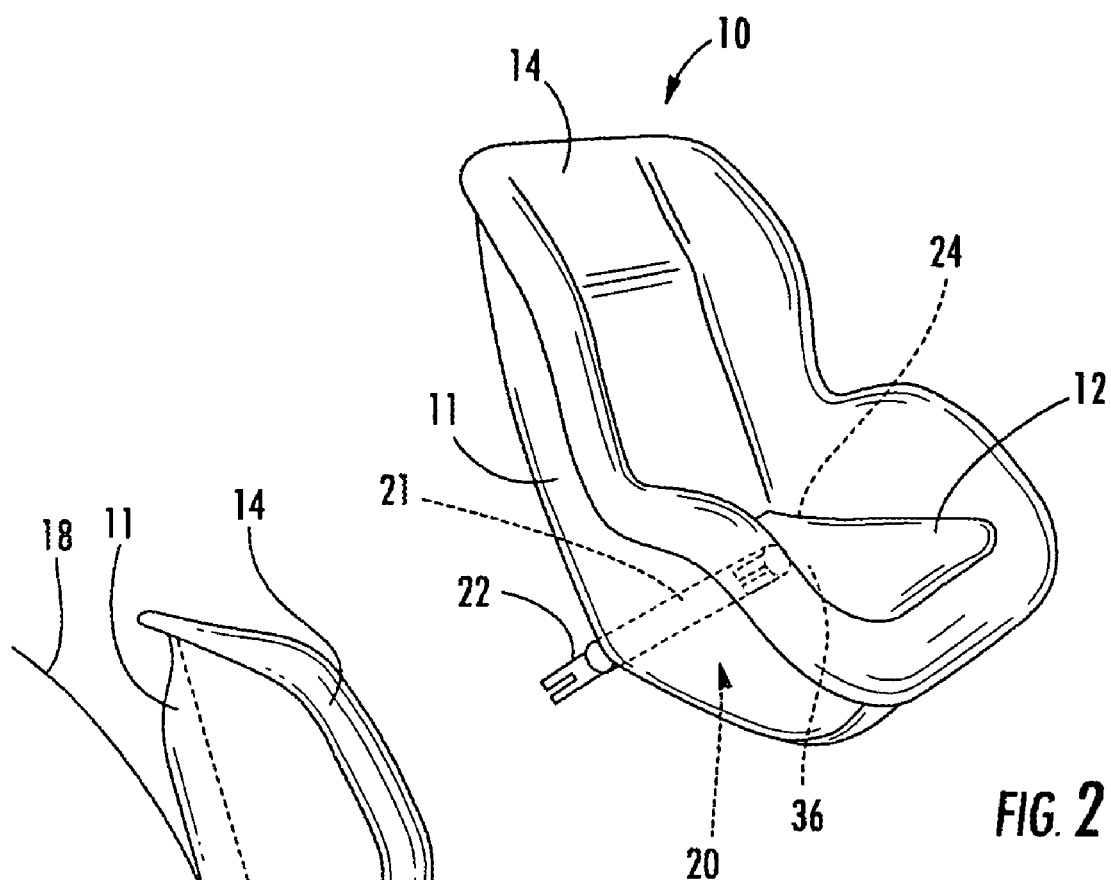
FIG. 2 is a perspective view of a forward-facing child safety seat in accordance with an embodiment of the invention.
Figure 3:
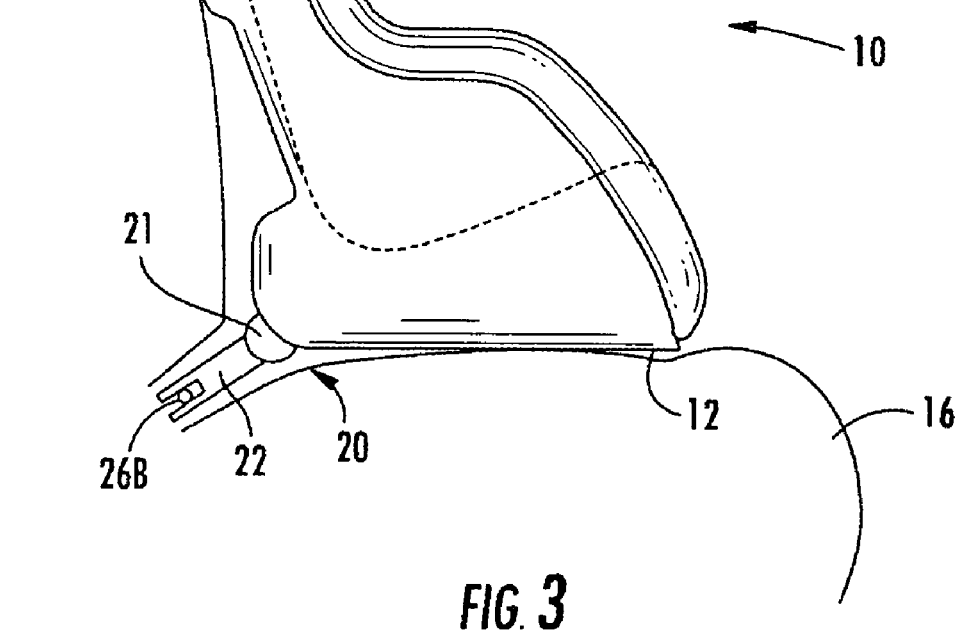
FIG. 3 is a side elevation of the child safety seat mounted on a vehicle seat.

A coupling assembly 20 is transversely mounted to the outside of the shell 11 at the bight of the seat bottom 12 and the seat back 14. As is shown generally in FIGS. 1, 2, and 3, the coupling assembly 20 includes a transversely extending bar 21 to which are attached first and second connectors 22 and 24.

Latch anchorages, for example, heavy anchor rings 26A-D, are mounted to the vehicle in the area of the bight between the bottom of the seat back 18 and the rear of the seat bottom 16. As noted above, this is conventional. First and second connectors 22 and 24 are mounted in fixed positions on the bar 21, and are adapted to lock onto the two inboard anchor rings 26B and 26C, thus permitting the safety seat 10 to be secured to the center of the vehicle seat.

Figure 4:
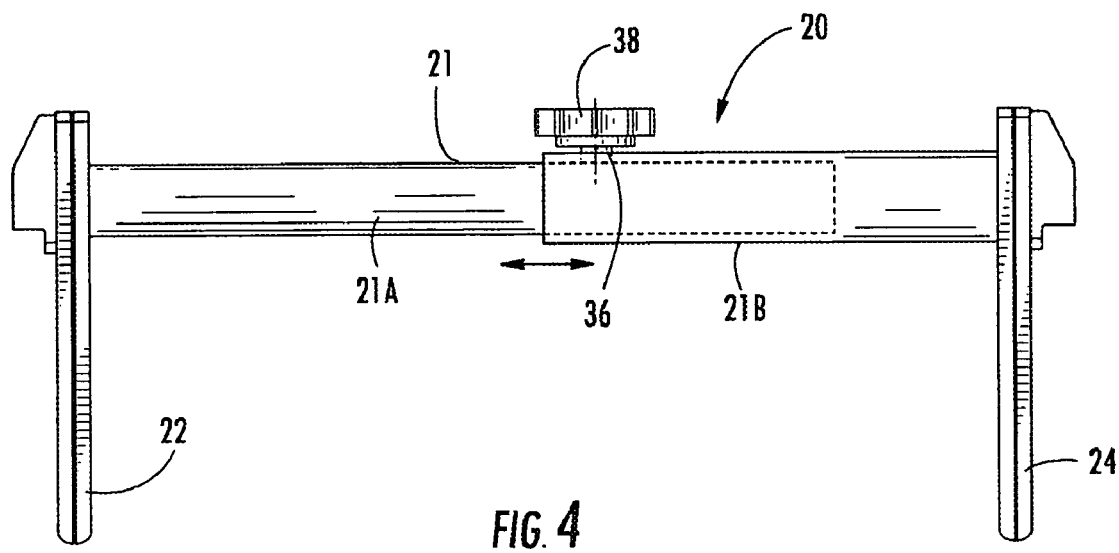
FIG. 4 is a top view of the coupling assembly according to an embodiment of the invention.
Figure 5:
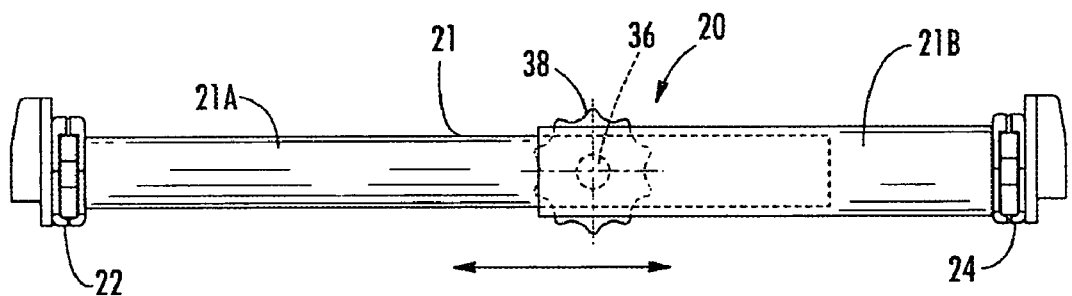
FIG. 5 is an elevation of the coupling assembly shown in FIG. 4.

The coupling assembly 20 is shown in further detail in FIGS. 4-6. Bar 21 is comprised of two telescoping bar components 21A, 21B. At least bar component 21B is tubular, and bar component 21A is received into bar component 21B and is slidable to adjustably vary the overall length of the bar 21. A screw-threaded rod 36 is positioned in a threaded hole in the wall of bar component 21B and is rotatable by means of a knob 38. The knob 38 is rotatable in one direction to release the rod 36 from clamping engagement with the bar component 21A, and in the other direction to clamp the bar components 21A, 21B into the desired, adjusted position. The bar 21 is thus capable of being adjusted to the length appropriate to align the connectors 22, 24 with the anchor rings 26B, 26C, respectively.

As is best shown in FIG. 6, the first and second connectors 22 and 24, connector 22 being shown, each preferably comprise latches of the type having two side walls 40, 42, with a transverse wall 44 therebetween. A latch member 48 is mounted on a pivot pin 50 that extends between the side walls 40, 42. The latch member 48 has a hook 50 that engages the transverse part of the anchor rings 26B, 26C. A cam surface on the end of the hook 50 displaces the hook 50 out of the path of the anchor rings 26C and 26D during insertion.

The latch member 48 is biased into the engaged position shown in FIG. 6 by a compression spring 52 that engages with the transverse wall 44. A link 54 extends through the spring 52 and has one end connected to a transverse pin 56 on the latch member 48. An ejector 58 ensures that the anchor ring 26B or 26C is pushed out from between the side walls 40, 42 and the latch member 48 at least as far as the cam surface of the hook formation 50.

A child safety seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A method of releasably securing a child safety seat to at least two variably spaced-apart rigid anchorage units carried by a vehicle proximate to a vehicle seat, the method comprising the steps of:
   (a) providing:
      (i) a transversely-extending coupling assembly for being attached to and carried by the safety seat;
      (ii) first and second connectors mounted on the coupling assembly and positioned for transverse adjustable alignment relative to respective first and second transversely spaced-apart rigid anchorage units;
   (b) placing the safety seat on a vehicle seat;
   (c) adjusting the spacing and transverse position of the first and second connectors relative to and into alignment with at least first and second ones of the rigid anchorage units; and
   (d) attaching the first and second connectors to respective ones of the first and second rigid anchorage units.

2. A method according to claim 1, and including a step of locking the first and second connectors that follows step (c).

3. A method according to claim 2, wherein the step of providing a transversely-extending coupling assembly comprises the step of providing first and second telescoping bar components, and the step of locking the first and second connectors comprises the step of attaching one of the first and second connectors to respective first and second telescoping bar components.

4. A method according to claim 3, wherein the step of locking the first and second connectors in the aligned position comprises the step of providing a clamp for engaging and clamping the first and second telescoping bar components into a releasable, fixed position relative to each other.

* * * * *